United States Patent Office 2,729,650
Patented Jan. 3, 1956

2,729,650

PRODUCTION OF DIALDEHYDES AND DERIVATIVES THEREOF

John Habeshaw, Clackmannshire, Scotland, and Charles John Geach, Shepperton, Middlesex, England, assignors to The British Petroleum Company Limited No Drawing. Application March 10, 1951, Serial No. 215,023

Claims priority, application Great Britain March 31, 1950

10 Claims. (Cl. 260—340.7)

This invention relates to the production of dialdehydic organic compounds. More particularly it relates to the synthesis of dialdehydes and derivatives thereof from acetals of olefinically unsaturated aldehydes.

The term "dialdehydic organic compound" is used herein with reference to dialdehydes and to mono- and diacetals thereof.

It is now well-known that aldehydes may be produced from mono-olefines by reaction with carbon monoxide and hydrogen, in the presence of a catalyst, under suitable conditions of temperature and pressure. The reaction is generally known as the Oxo reaction.

As feedstock to the Oxo reaction it is possible to use, in place of a simple olefin, an unsaturated organic compound containing also a functional group but the yield of aldehydes obtained varies considerably according to the chemical nature of the feedstock.

It has been found hitherto that unsaturated compounds having, in the molecule, an aldehydic group usually give poor yields of the primary product, that is, the dialdehyde formed by carbonylation at the double bond. This is due in part to the occurrence of secondary reactions in the reaction zone, particularly polymerisation, and in part to difficulties of product recovery which is complicated by the unstable nature of the dialdehydes. Attempts to reduce the activity of the aldehyde group present initially, for example, by condensation of the aldehyde group with suitable reagents and reaction of the product in the Oxo reaction, have not led to any marked improvement in the yields of the primary carbonylation product. Thus acrolein has been converted to its dimethyl and diethyl acetals but poor yields of bifunctional materials have been obtained by the use of these materials as feedstocks to the Oxo reaction. Acrolein has also been converted to its diacetate and reasonable yields of succindialdehyde diacetate produced therefrom in the Oxo reaction. The diacetate is, however, difficult to handle and the main product of the Oxo reaction only isolated from by-products of the reaction with difficulty and in poor yields.

It is an object of the invention to provide a process for the production of dialdehydes and derivatives thereof. It is a further object to provide a process for the production of derivatives of dialdehydes by the Oxo reaction in good yields and in a form in which they are recoverable from the reaction product.

It has now been found unexpectedly, in view of the poor results obtained using simple acetals, that cyclic acetals formed by the reaction of unsaturated aldehydes and diols undergo the Oxo reaction to produce the primary product in good yields, the product being, in general, recoverable from the reaction product without substantial loss.

According to the invention, the above objects are accomplished by a process which comprises reacting a cyclic acetal, of the type formed by condensation of an olefinically unsaturated aldehyde with an aliphatic compound having, in the molecule, at least two hydroxyl groups attached to a carbon chain with carbon monoxide and hydrogen under the conditions of the Oxo reaction.

Preferred cyclic acetals are of the type formed by condensation of unsaturated aldehydes with aliphatic diols having, in the molecule, a carbon chain and hydroxyl groups attached to adjacent carbon atoms or to carbon atoms separated by one carbon atom, these diols being of the general formula:

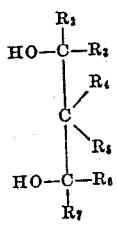

and

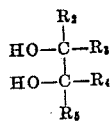

the acetals produced therefrom being of the general formulae, respectively:

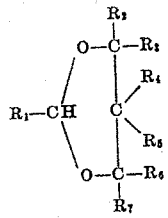

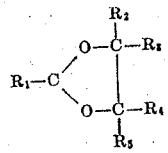

where $R_1$ is an aliphatic or cycloaliphatic radical containing at least one carbon to carbon double bond. $R_2$, $R_3$, $R_4$, $R_5$, $R_6$ and $R_7$ are hydrogen or substituted or unsubstituted radicals selected from the group comprising aliphatic, cycloaliphatic and aryl radicals.

Olefinically unsaturated aldehydes which may be employed for the formation of these compounds include aliphatic aldehydes such as acrolein, methacrolein, crotonaldehyde and ethylpropylacrolein and cyclic aldehydes such as tetrahydrobenzaldehydes.

Diols which may be employed for the formation of the cyclic acetals include 1,2 glycols, for example ethylene glycol and pinacol and 1,3 glycols, for example 1:3 butylene glycol. With acrolein, very satisfactory results are obtained using 1:3 butylene glycol. When tetrahydrobenzaldehyde is employed the preferred diol is ethylene glycol.

Conditions for the condensation of aldehydes and glycols are well known in the art. Descriptions of such processes are to be found in German specification No. 434,989 and by Lapworth and Haworth, in the Journal of the Chemical Society (1922), 79.

The Oxo reaction is preferably carried out in the presence of a cobalt catalyst, at a temperature in the range 120° C.–200° C. and at a pressure of 50–300 atmospheres or even higher.

The reaction may be carried out in solvents inert under the conditions used. Lower aromatic hydrocarbons (e. g.

benzene, toluen xylene) naphthenes (e. g. cyclohexane, methylcyclohexane) or paraffins (e. g. pentanes, hexanes, etc.) are suitable and readily available materials for this purpose. It is, in general, advantageous to employ a feedstock free of organic acids since these acids depress the reaction rate.

The preferred cobalt catalysts for use in the synthesis reaction are cobalt carbonyls, introduced into the synthesis reactors in the liquid or gaseous phase. The term "cobalt carbonyl" is used herein with reference to true carbonyls having molecules consisting of cobalt atoms and the group —CO, such as $Co_2(CO)_8$ and to carbonyl hydrides, having molecules consisting of cobalt atoms, hydrogen atoms and the group —CO, such as $Co(CO)_4H$.

The cobalt carbonyl catalyst may be produced by contacting carbon monoxide alone or in the presence of other gases such as hydrogen or nitrogen, with a solid cobalt-containing material in a catalyst-generating zone at a temperature within the range 30° C.–250° C. and at a partial pressure of carbon monoxide of 20–300 atmospheres to form a fluid cobalt containing compound.

It is preferred that the fluid product of the catalyst generating zone be removed either as a solution in a suitable solvent or in admixture with a carrier gas.

The catalyst generating zone may be operated in the presence of carbon monoxide alone, or if desired, there may be used mixtures of hydrogen and carbon monoxide. Thus, instead of carbon monoxide alone, there may be used mixtures of hydrogen and carbon monoxide, such as water gas, which are in general cheaper and more readily available. So called "blue water gas" is a particularly suitable gaseous mixture for use in the process of the invention. The preferred pressure range when using a carbon monoxide/hydrogen mixture is 30–250 atmospheres. Mixtures of carbon monoxide and hydrogen having a molar ratio in the range 1:5 to 1:0.5 are preferred, and particularly mixtures containing less hydrogen than corresponds to a $CO:H_2$ ratio of 1:2.

The solution or gaseous mixture obtained from the catalyst generating zone is suitable for direct use as a catalyst in the Oxo synthesis reaction. By operating according to the process of the invention, the Oxo synthesis reaction is carried out without dependence upon special solid cobalt catalysts of the type hereinbefore referred to.

The fluid catalyst according to the invention may be generated from any convenient source of cobalt, including cobalt metal, and readily-obtainable cobalt compounds such as cobalt oxide, cobalt carbonate or basic carbonate or cobalt sulphide. When metallic cobalt is used it is advantageous that the metal be either finely divided or dispersed over a suitable supporting material such as pumice or Kieselguhr. Cobalt oxide, and other solid compounds, may however, be used in suitably-sized lumps, in pellet form, or in any form convenient for charging to the vessel. Cobalt halides may be employed in the presence of a halogen acceptor, for example, metallic copper.

Cobalt recovered from products of the Oxo synthesis reaction may be converted to a fluid catalytic material according to the process of the invention. It has also been found that cobalt which has been deposited in an Oxo synthesis reactor is a suitable cobalt material for use in the present process.

The cobalt compound employed in the production of the fluid catalyst is usually subjected before use to reduction in the presence of hydrogen.

However, it is an important feature of the invention that in the use of cobalt oxide and carbon monoxide/hydrogen mixtures as the reactants for the process of the invention, a catalytic material is obtained without prior reduction of the cobalt oxide to metal. According to this feature of the invention catalytic materials for the Oxo synthesis reaction are obtained from cheaper reactants and under milder and more economical conditions than have hitherto been considered feasible.

The fluid catalyst may be prepared in the form of a solution by the use of any solvent which is inert to the said catalyst and which will not prevent the subsequent use of the catalyst in the Oxo synthesis reaction.

According to one method, the solvent and carbon monoxide-containing gas may be pumped concurrently or countercurrently, over a fixed bed of the cobalt-containing material.

Suitable solvents have been found to be hydrocarbons such as xylene, paraffins or cycloparaffins, ethers, esters, alkanols, such as octyl alcohol, and high-boiling products obtained in the Oxo synthesis reaction. If desired the high-boiling products may be hydrogenated before being used as solvents for the purpose described.

According to one method of operation, for the production of a gaseous catalyst a vessel is packed with a cobalt compound and maintained at a temperature of between 30° C. and 250° C. A carbon monoxide-containing gas (advantageously water gas) is passed through the vessel to maintain the partial pressure of carbon monoxide within a range of about 30–300 atmospheres.

To produce a liquid catalyst, the above procedure is modified by simultaneously pumping a solvent through the vessel, when the catalyst is obtained as a solution in the solvent.

When the fluid cobalt compound is to be employed as catalyst in the Oxo synthesis reaction in the gaseous state, the carbon monoxide-containing gas is preferably a mixture of carbon monoxide and hydrogen having a molar ratio at least 1:2. Under these conditions carbon monoxide and hydrogen are usually present in the effluent gas from the catalyst-generating zone in suitable proportions for direct use in the subsequent synthesis.

It is not, however, essential to employ these molar ratios of carbon monoxide and hydrogen in the catalyst generating zone since the proportions of $CO:H_2$ may be adjusted after catalyst generation by blending-in further carbon monoxide/hydrogen mixtures. Thus, if the catalyst-forming stage is operated to give a very high cobalt content in the effluent gas (for example, greater than 10 mg./litre), the small amount of gas passed through the generation stage will have little effect upon the composition of the total gas feed to the Oxo synthesis reactor.

When operating the catalyst generation zone, for the production of a gaseous phase product, in the temperature range of about 90–130° C., it has been found difficult to keep the cobalt content of the gaseous effluent constant, probably on account of the rapidity with which the cobalt content of the gas varies with temperature. Marked variations in the cobalt content of the gas are obviously inconvenient when the product is required for continuous use in the Oxo reaction, since the Oxo synthesis reaction rate is roughly proportional to cobalt concentration, which in turn has an effect on the reaction selectivity. When feeding gas direct from a catalyst producing zone to an Oxo reaction zone it is therefore preferred to operate the catalyst-producing zone at temperatures below 80° C. or above about 130° C., since constancy of cobalt injection rate is more readily obtained in these ranges.

If desired however, a gaseous product obtained in the catalyst-forming reaction may subsequently be dissolved in a solvent and the solution employed as catalyst in the Oxo synthesis reaction. Furthermore, solvents may be employed which would be unstable under the conditions of the catalyst-forming reaction. By this method the advantages attending the use of a solvent are retained while obtaining the advantages of the vapour phase generation of the catalyst.

By operating in this manner it is not necessary to pass the effluent gas from the catalyst generation zone to the Oxo synthesis reaction zone, and carbon monoxide gaseous mixtures which are not particularly suitable for use in the Oxo synthesis reaction may be employed. Thus fluid cobalt catalysts have been successfully produced from gases having a hydrogen content of 2–66%. However it appears that the partial pressure of the cobalt compounds in the effluent gas is very markedly dependent at constant temperature to the carbon monoxide partial pressure, so that production ratio would be small with gases of very high hydrogen contents (for example over about 70%), or alternatively very high total pressures would be needed to effect the reaction.

A suitable carbon monoxide/hydrogen mixture for use in the catalyst generating zone is obtained from effluent from the Oxo synthesis reaction zone in which it will usually be found that the hydrogen content is higher than in the feed thereto. The effluent from the catalyst-generation zone is preferably scrubbed for the removal of solid cobalt compounds and this stage can be combined with the scrubbing of the effluent gas from the Oxo synthesis reaction stage with economy of equipment.

Furthermore fluctuations in the cobalt content of the catalysts passed to the Oxo synthesis reactor may be avoided since the solutions so prepared can be bulked and a catalyst solution of constant cobalt content thus obtained.

The Oxo synthesis reaction zone is preferably operated at a temperature of 100° C.–180° C., and at a pressure of at least 50 atmospheres. The preferred pressure range in the Oxo synthesis reaction zone is 50–250 atmospheres and more particularly 100–200 atmospheres.

The catalyst-generating zone may be operated continuously or batchwise.

Preferably the catalyst and olefin feed rates are adjusted to maintain the weight of cobalt (estimated as metal) between 0.01% and 5%, preferably between 0.05% and 2%, of the weight of the olefin feed to the Oxo synthesis reaction zone.

Cobalt contained in the effluent from the Oxo synthesis reaction zone may be recovered according to conventional practice in operating the Oxo synthesis reaction and if desired, recycled to the catalyst-generating zone. Thus the liquid product from the Oxo synthesis reaction may be passed over a porous material (suitably pumice, kieselguhr, silica-gel or active charcoal) at elevated temperatures in the presence of hydrogen whereby the cobalt is retained upon the porous material. The cobalt-containing porous material may then be treated in the catalyst-generating zone.

It has been found that the cobalt in the effluent from the Oxo synthesis reaction zone may be recovered without the hydrogen treatment described if the product is subjected to a temperature in the range 120° C.–250° C. and a pressure of 50–500 lbs./sq. in. for a period of time of 1–10 minutes.

It is particularly preferred when operating with these catalysts that the Oxo synthesis reactor be operated under continuous conditions without the introduction of cobalt compounds in the solid phase. The control of reaction achieved is in no small measure in consequence of the uniform rate of reaction which has been found to result from the introduction of the cobalt carbonyl catalyst in the liquid or gaseous phase. Notwithstanding the above, solid cobalt metal or compounds may be deposited in the reactor by decomposition of part of the cobalt carbonyl and do not detract from the efficiency of the process. This preferred method of operation includes within its scope a process in which cobalt in the solid phase is so formed in the reactor. Clearly also, the presence of small amounts of cobalt in the solid phase in the reactor when starting up the process will not materially effect operation and a continuous process, started up under the conditions lies within the scope of the preferred manner of operation.

The mono-acetal of the dialdehyde produced in the Oxo reaction may be recovered from the product by distillation, preferably under reduced pressure. Unreacted aldehyde is removed as a first main fraction and may be recycled to the reaction zone. The mono-acetal is recovered as a higher boiling fraction.

If desired the mono-acetal may be converted to the corresponding dialdehydes by known methods, for example, hydrolysis with dilute mineral acid, for example by heating to about 70° C. with 10% by weight hydrochloric acid.

Frequently the dialdehyde may be required for subsequent conversion steps, and the residue after removal of the unreacted unsaturated aldehyde may be fed directly to such subsequent steps without prior separation of the dialdehyde.

The invention is illustrated but in no way limited by the following examples.

Examples 1–7 relate to the production of acetals from 1.2 and 1.3 glycols. Examples 8–13 relate to the reaction of acetals under the conditions of the Oxo reaction in accordance with the present invention. Example 14 is given by way of comparison.

EXAMPLE 1

*Preparation of the acetal of acrolein and 2,3-butylene glycol*

A mixture of chloroform (223 grams), 2.3 butylene glycol (91 grams), acrolein (54.5 grams) and ammonium chloride (5 grams) was refluxed in a water bath the condensed reflux being passed into a separator from which the water phase was removed before returning the reflux to the reaction vessel. The heating was continued for 2.5 hours during which time 19 mls. of water was taken off. After cooling and neutralising with calcium oxide, the mixture was filtered and distilled, the required acetal having the formula

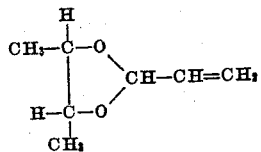

being collected as the fraction distilling between 127.5° and 128.5° C. at 760 mm. The product had an analytical purity of 100 per cent.

EXAMPLE 2

*Preparation of the acetal of ethyl propyl acrolein and 1,3 butylene glycol*

This was carried out by the method described in Example 1 using the same molecular proportions of reagents. On distillation the acetal having the formula

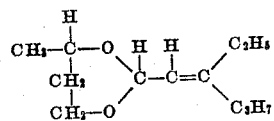

was recovered as the fraction distilling between 70–95° C. at 5 mm. pressure, the product having an analytical purity of 95 per cent.

EXAMPLE 3

*Preparation of the acetal of crotonaldehyde and 1,3 butylene glycol*

A mixture of 1.3 butylene glycol (90 grams) and powdered anhydrous calcium chloride (7.5 grams) was cooled and stirred and 1 cc. of ethanol containing 31 per cent w./w. of anhydrous hydrogen chloride added. Crotonaldehyde (70 grams) was then added slowly with stirring keeping the temperature below 35° C. The mixture was stirred for a further 30 minutes and then allowed to stand for 20 hours. Sufficient calcium oxide was then added to make the solution just alkaline to phenolphthalein. The lower layer of the mixture so obtained contained aqueous calcium chloride and unchanged glycol and crotonaldehyde. The upper layer was distilled yielding 88 grams of the acetal having the formula

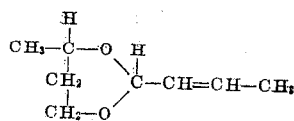

boiling between 55° and 58° C. at 9 mm.

EXAMPLE 4

*Preparation of the acetal of Δ3 tetrahydrobenzaldehyde and 1,3 butylene glycol*

Using the method described in Example 1, but with benzene as solvent, the reaction was completed as shown by the cessation of water evolution, in 5.5 hours. The original reaction mixture formed two phases when cold but on heating to reflux benzene a single phase was produced. On cooling after reaction, two phases again separated. The unreacted glycol was recovered by distillation of the lower layer. Distillation of the upper (benzene) layer gave the acetal having the formula

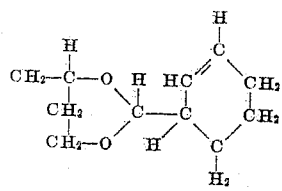

as a fraction distilling between 75–85° C. at 3 mm. pressure in a yield of 90 per cent of the theoretical based on the aldehyde used.

EXAMPLE 5

*Preparation of the acetal of Δ3 tetrahydrobenzaldehyde and ethylene glycol*

The method employed was that described in Example 4. Two phases persisted throughout the reaction and the reaction mixture was kept well stirred to ensure thorough mixing. Distillation of the benzene layer of the product gave the acetal having the formula

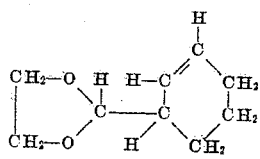

as the fraction distilling between 67°–72° C. at 2 mm. pressure, the yield being 90 per cent of the theoretical based on aldehyde used.

EXAMPLE 6

*Preparation of the acetal of glycerol and acrolein*

Acrolein (50 mls.), glycerol (70 mls.), chloroform (130 mls.) and ammonium chloride (2 grams) were refluxed as described in Example 1 for 16 hours. After neutralising and filtering the acetal having the formula

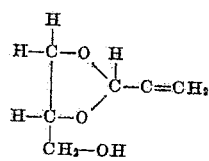

of glycerol and acrolein was obtained as a viscous liquid distilling at 80° C. at 3 mm. pressure. The product was obtained in a yield of 70 per cent of theory based on acrolein charged and had an analytical purity of 96 per cent.

EXAMPLE 7

*Preparation of the acetal of acrolein and 1,3 butylene glycol*

This was prepared by the method described in Example 3 using the same molecular proportions of reagents. On distillation of the product, the acetal having the formula

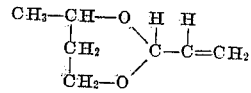

was recovered as a product distilling between 43° and 47° C. at 10 mm. pressure, the yield being 85 per cent of theory based on the acrolein charged. The product had an analytical purity of 98 per cent.

EXAMPLE 8

*Reaction of the acetal of acrolein and 2,3 butylene glycol*

The acetal of acrolein and 2,3 butylene glycol prepared as described in Example 1 was reacted with water gas using dicobalt octacarbonyl catalyst under the following conditions. 50 volumes of the acetal were dissolved in 50 vols. 2,3 butylene glycol and dicobalt octacarbonyl (2 grams/litre charge) used as catalyst. The reaction was effected batchwise with water gas having a carbon monoxide/hydrogen ratio of 1:1.2 in a rocking autoclave, the pressure being 2500–3000 lbs./sq. in. and the temperature 150–160° C. About 80 per cent by weight of the acetal reacted, about 40 per cent by weight to the dialdehyde derivative.

EXAMPLE 9

*Reaction of the acetal of ethyl propyl acrolein and 1,3 butylene glycol*

The acetal was prepared as described in Example 2. This was reacted continuously, the liquid feed (230 vols. of acetal and 20 volumes of 1,3 butylene glycol) being pumped downwards concurrently with water gas having a carbon monoxide/hydrogen ratio of 1:1.25 through a stainless steel reactor packed with 400 cc. of ⅛″ steel rings. The liquid feed rate was 100 ml./hour and the water gas rate 70 litres/hour (at NTP) the temperature being 150° C. and the pressure 2500 lbs./sq. in. About 50 per cent of the acetal fed was converted, a dialdehyde fraction amounting to 40 per cent of the product obtained boiling over 86° C. at 3 mm. This fraction contained by analysis about 40 per cent of the dialdehyde derivative. Dicobalt octacarbonyl in solution in the feed (2 grams Co/litre feed) was used as catalyst.

EXAMPLE 10

*Reaction of the acetal of crotonaldehyde and 1,3 butylene glycol*

The acetal was prepared as described in Example 3 and was reacted batchwise in a stainless steel rocking autoclave with water gas having a carbon monoxide/hydrogen ratio of 1:1.25 the reaction mixture being 90 volumes of acetal and 90 volumes of benzene. Dicobalt octacarbonyl (2.0 grams Co/litre charged) was used as catalyst. At a temperature of 136° C. and a pressure of 3000 lbs./sq. in. adsorption of water gas occurred, the reaction being continued for 2 hours. After removal of solvent, unchanged acetal was distilled off at a pressure of 5 mm. leaving a residue containing by analysis about 70 per cent of dialdehyde derivative. This residue boiled over 136° C. at 5 mm. and amounted to 50 per cent by weight of the total solvent free product.

EXAMPLE 11

*Reaction of the ethylene glycol acetal of 3 tetrahydrobenzaldehyde*

The acetal was prepared as described in Example 5. The acetal was reacted batchwise with water gas in a stainless steel rocking autoclave. The charge consisted of 1 vol. of acetal with 1 volume of cyclohexane, dicobalt octacarbonyl being used as catalyst in a concentration of 0.27 gram of cobalt/litre of liquid charge. The water gas had a $CO:H_2$ ratio of 1:1.3. The temperature was 150° C. and the pressure 3000 lbs./sq. in. the pressure being maintained substantially constant by addition of further water gas as reaction proceeded. The reaction was stopped after 1 hour and the product removed from the autoclave. After removal of cyclohexane solvent by distillation at atmospheric pressure, the cyclohexane-free product was fractionated in an 8-plate column with the results shown in the following table.

TABLE

| Fraction No. | Boiling range, °C., at 1 mm. pressure | Wt. percent of cyclohexane free product | Refractive Index $n_D^{20}$ |
| --- | --- | --- | --- |
| 1 | 67–71 | 17.7 | 1.4753 |
| 2 | 71–80 | 9.1 | 1.4778 |
| 3 | 80–98 | 7.3 | 1.4802 |
| 4 | 98–110 | 48.6 | 1.4808 |
| 5 | 110–132 | 10.0 | 1.4823 |
| Residue | 132 | 7.3 | |

Fractions 1, 2 and 3 contained unchanged acetal and some of the acetal of hexahydrobenzaldehyde. Fraction 4 was the required dialdehyde derivative (cyclohexane dialdehyde monoacetal) and fraction 5 the same material in a less pure state.

Similar results were obtained in the reaction of Δ3 tetrahydrobenzaldehyde-1,3 butylene glycol acetal.

EXAMPLE 12

*Reaction of the acetal of glycerol and acrolein*

The acetal was prepared as described in Example 6. The acetal was reacted with water gas in a continuous apparatus as described in Example 9, the temperature being 161° C. and the pressure 2800 lbs./sq. in., the other conditions being the same. The liquid feed was made by dissolving 100 volumes of the acetal in 200 volumes of benzene. Analysis showed that 70 per cent of the acetal reacted, 30 per cent to give a dialdehyde derivative.

EXAMPLE 13

In this 4-methyl-2-vinyl-1,3-dioxan (made from acrolein and 1,3-butylene glycol) was reacted in the presence of dicobalt octacarbonyl as catalyst.

300 mls. of vinyl dioxan with 300 mls. of benzene and 0.23 gram of cobalt in the form of dicobalt octacarbonyl were pumped concurrently upflow with water gas through a small tube reactor of stainless steel, 70 litre per hour of water gas being passed through for 2 hours. The temperature was 150° C. and the pressure 2500 p. s. i. g. The liquid product recovered at the end of this time contained 34% by weight of the aldehyde estimated by the hydroxylamine method.

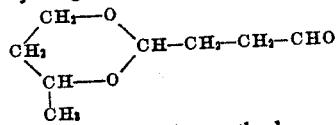

The benzene solvent was distilled from the reaction mixture at atmospheric pressure. From the product then remaining the following fractions were removed on distillation under reduced pressure.

| Fraction No. | Boiling Range | Wt. percent of solvent free product |
| --- | --- | --- |
| 1 | To 73° C./11 mm | 24 |
| 2 | 73° C./11 mm.–78/3 mm | 36 |
| 3 | 78/3 mm.–114/3 mm | 15 |
| 4 | Residue | 25 |

Fraction 1 was unchanged starting material. Fraction 2 was the compound shown above, yielding succinic acid on oxidation with hydrogen peroxide in sulphuric acid solution.

EXAMPLE 14

This example provides a comparison between the yields obtained using an acetal of a diol in the Oxo reaction with the yields obtained using an acetal of a mono-alcohol.

The diethyl acetal of Δ3 tetrahydrobenzaldehyde was reacted under the conditions described in Example 2. Fractionation of the solvent freed product gave a mixture containing the unchanged diethyl acetal, free tetrahydrobenzaldehyde and some other unidentified material as the first fraction (51% of the solvent free product). A further fraction was obtained distilling between 115° and 163° C./5 mm. which contained acetals but very little free aldehyde. This amounted to 24 per cent of the solvent free product. The residue of high boiling products made up the remaining 25 per cent of the solvent free product.

We claim:

1. A process for the production of derivatives of dialdehydic organic compounds comprising reacting a cyclic acetal selected from the group consisting of a compound having the formulas

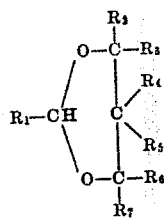

and

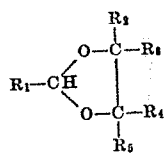

wherein $R_1$ is a radical selected from the group consisting of aliphatic and cycloaliphatic radicals, said $R_1$ containing at least one carbon to carbon double bond; and wherein $R_2$, $R_3$, $R_4$, $R_5$, $R_6$ and $R_7$ are elements selected from the group consisting of hydrogen, aliphatic radicals, cycloaliphatic radicals and aryl radicals, with carbon monoxide and hydrogen at a temperature in the range of about 120–200° C., and at a pressure of about 50 to about 300 atmospheres to produce a mono-acetal of a dialdehyde.

2. A process as specified in claim 1 in which the Oxo reaction is carried out in the presence of separately prepared dicobalt octacarbonyl.

3. A process as specified in claim 1 in which the Oxo reaction is carried out in the presence of separately prepared cobalt tetracarbonyl hydride.

4. A process as defined in claim 1 wherein said cyclic acetal is

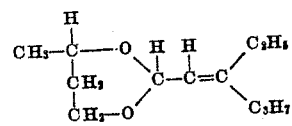

5. A process as defined in claim 1 wherein said cyclic acetal is

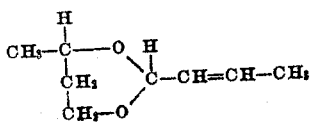

6. A process as defined in claim 1 wherein said cyclic acetal is

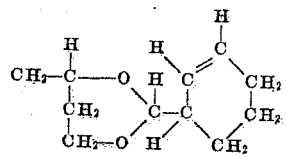

7. A process as defined in claim 1 wherein said cyclic acetal is

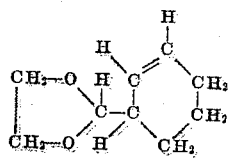

8. A process as defined in claim 1 wherein said cyclic acetal is

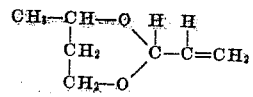

9. A process as defined in claim 1 wherein the process is carried out in the presence of a cobalt containing catalyst.

10. A process as defined in claim 9 wherein said cobalt catalyst is selected from the group consisting of cobalt carbonyls and cobalt carbonyl hydrides.

References Cited in the file of this patent

UNITED STATES PATENTS

| | | |
|---|---|---|
| 2,462,448 | Whitman | Feb. 22, 1949 |
| 2,497,303 | Gresham et al. | Feb. 14, 1950 |
| 2,587,858 | Keulemans | Mar. 4, 1952 |

FOREIGN PATENTS

| | | |
|---|---|---|
| 434,989 | Germany | Oct. 6, 1926 |

OTHER REFERENCES

Fieser et al.: "Org. Chem.," D. C. Health and Co., Boston, Mass., 1944 ed., page 221.